United States Patent
Goldmann, II

[11] Patent Number: 6,024,000
[45] Date of Patent: Feb. 15, 2000

[54] METHOD OF PROTECTING INSULATED HAND TOOLS

[76] Inventor: Russell A. Goldmann, II, 1795 Northland Ave., Highland Park, Ill. 60035

[21] Appl. No.: 09/065,645

[22] Filed: Apr. 23, 1998

[51] Int. Cl.[7] ........................................................ B25B 7/00
[52] U.S. Cl. ............................... 81/427.5; 76/119; 29/447
[58] Field of Search .................................. 76/119, 101.1; 81/427.5, 489, 477.1; 29/447

[56] References Cited

U.S. PATENT DOCUMENTS

| | | |
|---|---|---|
| 1,503,536 | 8/1924 | Klauke ...................................... 30/341 |
| 5,279,140 | 1/1994 | Blake et al. . |
| 5,485,667 | 1/1996 | Kleshinski . |
| 5,687,995 | 11/1997 | Mori et al. . |
| 5,767,444 | 6/1998 | Heimlicher . |
| 5,809,853 | 9/1998 | Hudson . |

Primary Examiner—Timothy V. Eley
Assistant Examiner—Willie Berry, Jr.
Attorney, Agent, or Firm—Cook, Alex, McFarron, Manzo, Cummings & Mehler, Ltd.

[57] ABSTRACT

A method for insulating hand tools includes the application of a first and a second coating of protective insulating material along the handle of the tool. Inserting the end of the handle into a heat shrinkable end cap and providing heat to the cap to shrink it and thus seal the end of the tool. The added protection this end cap provides is both as an additional insulation as well as an increase in the impact strength of the tool.

5 Claims, 2 Drawing Sheets

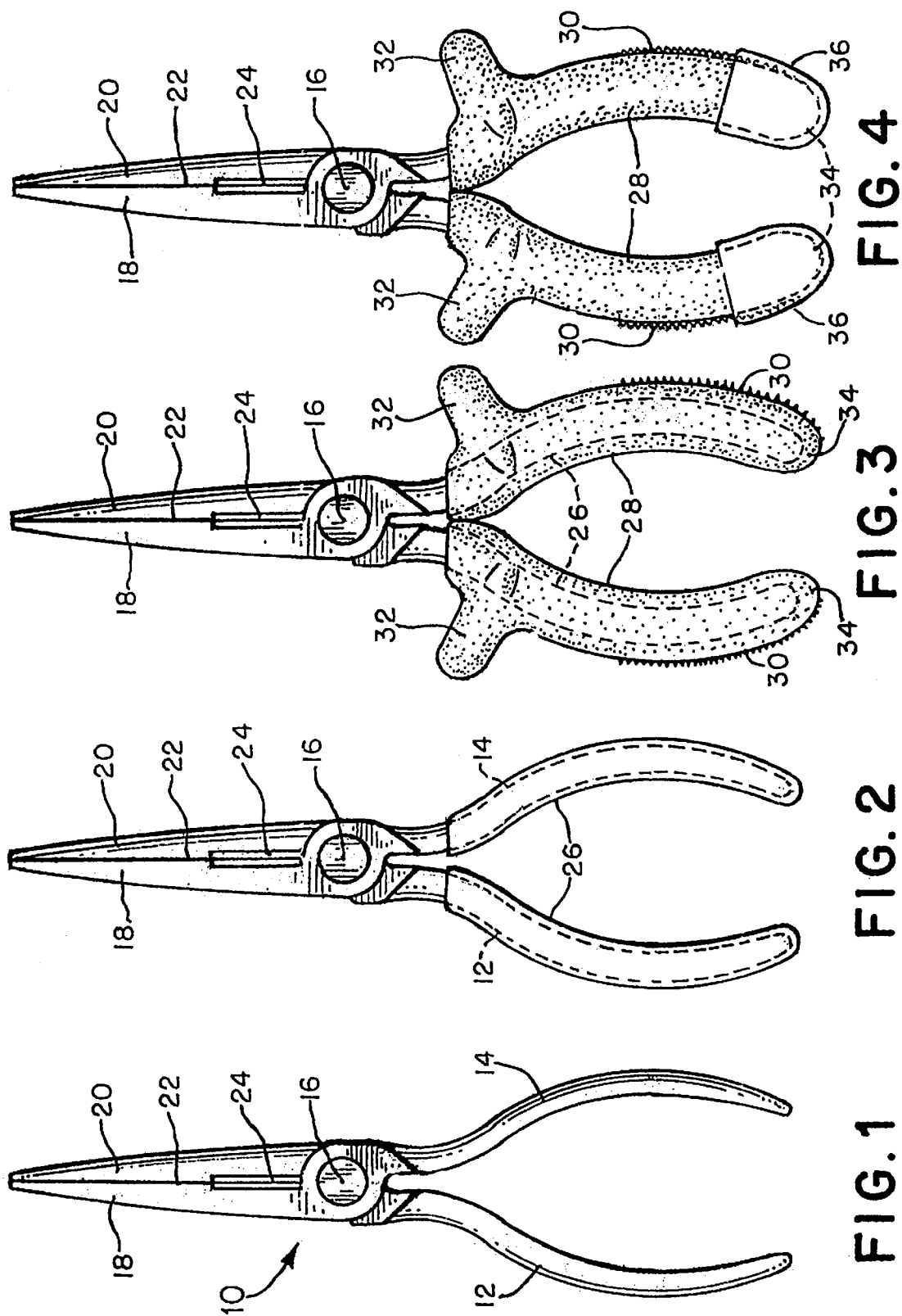

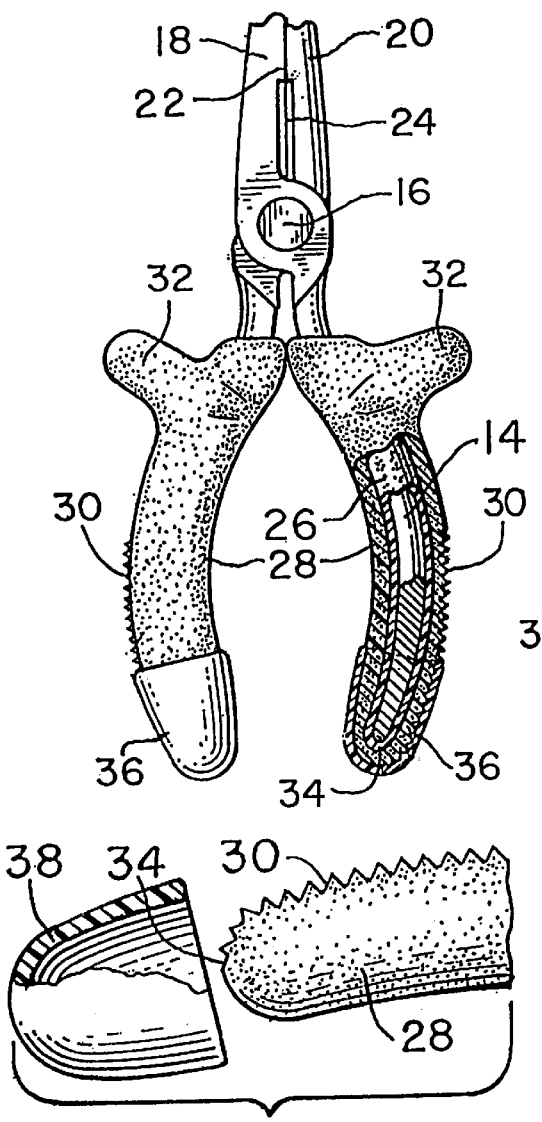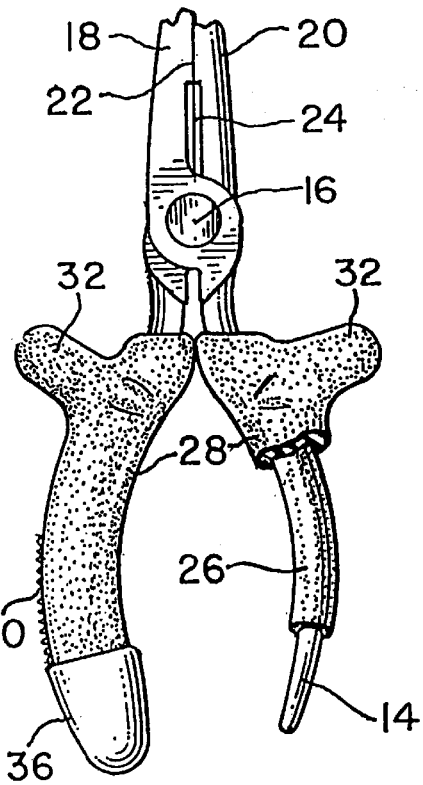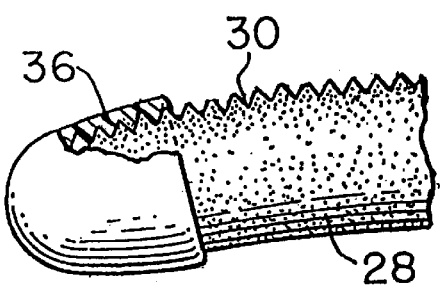

METHOD OF PROTECTING INSULATED HAND TOOLS

BACKGROUND OF THE INVENTION

The present invention relates generally to a method for providing protection to insulated tools, and more particularly to the utilization of end caps on the bottom handles of insulated tools to increase the impact test performance of the tool.

In order to reduce the chance of injury, particularly electrical shock, where a tool may make contact with an energized source, tools have historically been insulated upon their handle portion. Such insulation must meet current American Society for Testing and Materials (ASTM) standards for both a voltage insulation rating as well as an impact test performance. At the time of this writing, the current voltage insulation rating is 1,000 volts, and the current impact test standards require a 2 meter equivalent ambient impact test followed by a 0.6 meter equivalent cold temperature (−25° C.) impact test.

The use of a typical insulated tool, although inadvertently, most certainly includes mishandling or slippage which leads to a dropping thereof. Such dropping, when subjected to a substantial impact, as onto a hard surface from a substantial height may cause the insulation on the handle ends to become damaged. Additionally, a premature wearing down with which such a tool may be subjected to may cause user dissatisfaction. These situations in turn requires the tool to be prematurely removed from service.

Accordingly, it is a general object of the present invention to provide a new and improved method for providing protection to insulated tools.

It is a more specific object of the present invention to provide an end cap upon the bottom handles of insulated tools to increase the impact test performance thereof.

Another object of the present invention is to provide a cost-effective solution to the wear and tear problem of insulated tools.

These and other objects, features and advantages of the present invention will be clearly understood through a consideration of the following, detailed description.

SUMMARY OF THE INVENTION

The invention is directed to a method for protecting insulated hand tools, which method comprises applying a first protective coating along the handle portion of a tool; applying a second protective coating over the first protective coating; inserting the end of the handle of the tool into a heat shrinkable end cap; and providing heat to shrink the cap around the end to provide a seal thereon.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a frontal view of a typical forged steel handle pliers set;

FIG. 2 is a frontal view of the pliers of FIG. 1 with a first protective coating on the handles thereof;

FIG. 3 is a frontal view of the pliers of FIG. 2 with a second protective coating on the handles thereof;

FIG. 4 is a frontal view of the pliers of FIG. 3 constructed in accordance with the principles of the present invention;

FIG. 5 is a cross-sectional view of one of the handles of FIG. 4 depicting each layer of protection;

FIG. 6 is an exploded view of one of the handles of FIG. 4 depicting the relative dimensions of each layer of protection;

FIG. 7A illustrates a handle of FIG. 3 and an expanded end cap of the present invention;

FIG. 7B illustrates the application of heat onto the end cap of FIG. 7A when the handle is inserted thereto;

FIG. 8 illustrates the fully recovered (after heating) end cap of FIG. 7B as it seals the handle.

DESCRIPTION OF THE PREFERRED EMBODIMENT

Referring to the drawings, and particularly to FIG. 1, a typical forged steel handle pliers 10 includes a pair of opposed handle portions, a left handle 12 and a right handle 14, pivotal about a flush rivet 16. Actuation of these handle portions about the rivet pivots the corresponding jaw portions, the left jaw 18 corresponding to the right handle 14 and the right jaw 20 corresponding to the left handle 12. Each jaw portion includes a gripping portion 22 and a cutting portion 24. Although the preferred embodiment illustrates a long-nose pliers for use with the present invention, it will be understood that this long-nose pliers is for illustration purposes and the present invention is not deemed to be limited to the application thereof. Other insulated tools for which the present invention is applicable includes, but in no way is limited to, all varieties of pliers, crimping tools, stripping tools, and cable cutters.

FIG. 2 illustrates the use of a first coating 26 over the handles of the pliers 10. Typically, in the case of a regular set of pliers, this first coating is designed to give the user a better grip for a more precise or stronger hold. However, for insulation and purposes of the present invention, the first coating 26 as shown in FIG. 2 is provided to protect the user as an insulating cover. The common means in the tooling industry for applying this first coat, comprised of a PVC based plastisol, is by dip molding. This plastisol dipping method requires a dip molding for the initial application of the first coating followed by the correct curing temperature for an amount of time such that the plastisol bonds with the steel handle.

Whatever the method and however applied, this first coat results in a covering (typically colored) cast on the metal handles of the pliers. This insulating covering is designed to be irremovable. The high-dielectric white inner coating is bonded to the tool and makes sure of an immediate, definitive and total insulation of the tool.

FIG. 3 is illustrative of the use of a second coating 28 applied over the first 26. This second coat is again comprised of a PVC based plastisol and is designed to be irremovable and flame retardant. This coating is applied not only for its flame-retardant and impact-resistant properties, but also, secondarily, as a wear-and-tear, indicating source. In particular, as this second coat 28 is typically orange and the first coat 26 is typically white, if the orange coating 28 cracks, breaks or becomes damaged enough so as to enable the white inner layer to become visible, this is indicative of an unsafe tool and one that must be immediately destroyed.

Application of this second coat 28 is much like the first. A plastisol dipping method is used which requires a dip molding for the initial application of the second coating followed by the correct curing temperature for an amount of time such that the second coat of plastisol bonds with the first.

What results is depicted in FIG. 3. This outer coating may include ridges 30 on the outer surface of the handle portions to aid in the gripping of the tool. Integral guards 32 are employed to help prevent hand contact with the conductive parts of the tool.

The method of the present invention is utilized to protect these coated ends and prolong the life of the insulated tools in general. This is accomplished by providing end caps 36 over the ends 34 of the outer covering, as shown in FIG. 4.

The steps used to accomplish the method of the present invention are depicted as completed in order through FIGS. 1–4. FIGS. 5 and 6 illustrate those steps as a cross-sectional view and an exploded view respectively depicting each layer of protection and the relative dimensions thereof. As shown in FIGS. 5 and 6, the right handle 14 of the pliers 10 is first bonded with the high-dielectric white inner coating 26. Over the inner coating 26, the outer flame retardant, impact-resistant coating 28 is applied. Finally, the end caps 36 are applied to the ends 34 of the outer coating according to the principles of the present invention.

The end caps 36 for use in the present invention are preferably heat shrinkable with adhesive in order to provide the tightest weather-tight seal over the ends 34 of the handles. The end caps used by the preferred embodiment are commercially available through Raychem Corporation and designated type 101A052. However, other heat shrinkable end caps may be used, such as those provided by 3M Electrical Specialties Division and the like. Although the preferred application method of the present invention involves the heat shrinking of the caps 36 over the ends 34, it should be understood that the present invention is not intended to be limited thereto. Other means of applying the caps 36 may include the use of an adhesive material, a vacuum fit, or any other similar means.

The heat shrinking of the cap is illustrated in FIG. 7. FIG. 7A shows a handle of a pair of pliers including the outer coating 28 and ridges 30 along with an expanded (before heating) end cap 38. FIG. 7B shows the end 34 of the handle inserted into the expanded end cap 38 and the subsequent application of heat thereto by a heating source 40. This heating source may be in the form of a blower (preferred), a heating chamber or any similar means. After heating, as shown in FIG. 8, the expanded end cap 38 (FIG. 7B) becomes fully recovered 36 and shrinks to seal around the end of the handle and creates a smooth covering with no loose ends.

Thus, a method for providing protection to insulated tools has been described. The method requires minimal effort on the part of the manufacturer, making it a very cost-effective way to enhance the operation of and prolong the life of insulated tools. Furthermore, these caps not only provide for extra insulation, but increase the impact test performance well past both the ambient and cold standards of the ASTM.

While a particular embodiment of the invention has been shown and described, it will be obvious to those skilled in the art that changes and modifications may be made therein without departing from the invention in its broader aspects, and, therefore, the intent in the appended claims is to cover all such changes and modifications as fall within the true spirit and scope of the invention.

I claim:

1. A method for protecting insulated hand tools, comprising:

providing an uninsulated hand tool, said hand tool having at least one handle, said handle having an end;

applying a first protective coating over the majority of said handle and said end;

applying a second protective coating over said first protective coating;

inserting said end into a heat shrinkable end cap; and providing heat to said end cap thereby shrinking said cap about said end to form a seal.

2. The method of claim 1 wherein said first coat is a first color and said second coat is a second color.

3. The method of claim 2 wherein said first color is white and said second color is orange.

4. A method for protecting insulated hand tools as defined in claim 1 wherein said first and said second are comprised of a PVC based plastisol.

5. A method for protecting insulated hand tools as defined in claim 1 wherein said end cap includes an inside surface, said inside surface having an adhesive thereon.

* * * * *